United States Patent
Atzler et al.

(10) Patent No.: US 10,443,567 B2
(45) Date of Patent: Oct. 15, 2019

(54) METHOD FOR ESTIMATING A WIND SPEED AT A WIND TURBINE

(71) Applicant: VESTAS WIND SYSTEMS A/S, Aarhus N (DK)

(72) Inventors: Martin Atzler, Randers (DK); Thomas Scheel, Stolberg (DE); Lars Finn Sloth Larsen, Sydals (DK); Thomas Krüger, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 82 days.

(21) Appl. No.: 15/528,441

(22) PCT Filed: Nov. 20, 2015

(86) PCT No.: PCT/DK2015/050353
§ 371 (c)(1),
(2) Date: May 19, 2017

(87) PCT Pub. No.: WO2016/078668
PCT Pub. Date: May 26, 2016

(65) Prior Publication Data
US 2017/0314533 A1    Nov. 2, 2017

(30) Foreign Application Priority Data
Nov. 21, 2014 (DK) .................. 2014 70724

(51) Int. Cl.
*F03D 7/02* (2006.01)
*F03D 17/00* (2016.01)
(Continued)

(52) U.S. Cl.
CPC ........... *F03D 7/0224* (2013.01); *F03D 7/022* (2013.01); *F03D 7/0276* (2013.01); *F03D 7/046* (2013.01);
(Continued)

(58) Field of Classification Search
CPC ............ F05B 2270/304; F05B 2270/32; F05B 2270/327; F05B 2270/328;
(Continued)

(56) References Cited

U.S. PATENT DOCUMENTS 5,155,375 A    10/1992 Holley
8,803,352 B1    8/2014 Koerber et al.
(Continued)

FOREIGN PATENT DOCUMENTS

CN    102562446 A    7/2012
CN    102619685 A    8/2012
(Continued)

OTHER PUBLICATIONS

Chinese Office Action for Application No. 201580063374.0 dated Jul. 16, 2018.
(Continued)

*Primary Examiner* — Robert E Fennema
*Assistant Examiner* — Jonathan Michael Skrzycki
(74) *Attorney, Agent, or Firm* — Patterson + Sheridan, LLP (57) ABSTRACT

A fast-converging and reliable method for estimating a wind speed at, for example, a wind turbine comprising a rotor carrying a set of variable pitch angle wind turbine blades. The estimated wind speed is iteratively derived using a wind turbine rotor rotational speed, a turbine blade pitch angle, and a derived initial estimated wind speed. The initial estimated wind speed is based on the rotational speed and an initial tip speed ratio. The initial tip speed ratio is selected to be a value greater than a minimum tip speed ratio, wherein the minimum tip speed ratio defines a control region stability limit as a function of the pitch angle. Thus, for a given pitch (Continued)

angle, a minimum tip speed ratio is derived as a limit or boundary point between a stable control region and an unstable control region.

13 Claims, 4 Drawing Sheets

(51) Int. Cl.
  *F03D 7/04* (2006.01)
  *G01P 5/00* (2006.01)
  *G05B 19/402* (2006.01)

(52) U.S. Cl.
  CPC ............... *F03D 17/00* (2016.05); *G01P 5/00* (2013.01); *G05B 19/402* (2013.01); *F05B 2270/304* (2013.01); *F05B 2270/32* (2013.01); *F05B 2270/327* (2013.01); *F05B 2270/328* (2013.01); *F05B 2270/708* (2013.01); *G05B 2219/2619* (2013.01); *Y02E 10/723* (2013.01)

(58) Field of Classification Search
  CPC .... F05B 2270/708; Y02E 10/723; G01P 5/00; G05B 19/402; G05B 2219/2619
  See application file for complete search history.

(56) References Cited

U.S. PATENT DOCUMENTS

| | | |
|---|---|---|
| 2010/0133817 A1 | 6/2010 | Kinzie et al. |
| 2011/0084485 A1 | 4/2011 | Miranda et al. |
| 2012/0078518 A1 | 3/2012 | Krishna |
| 2013/0140819 A1 | 6/2013 | Abdallah et al. |
| 2013/0302161 A1* | 11/2013 | Koerber ............... F03D 7/04 416/1 |
| 2015/0354535 A1* | 12/2015 | Pineda Amo ......... F03D 7/0224 416/1 |
| 2016/0084233 A1* | 3/2016 | Evans ................... F03D 17/00 73/112.01 |

FOREIGN PATENT DOCUMENTS

| | | |
|---|---|---|
| CN | 103244350 A | 8/2013 |
| JP | 2014199055 A | 10/2014 |
| WO | 2009153614 A2 | 12/2009 |
| WO | 2014111504 A1 | 7/2014 |
| WO | 2014111522 A1 | 7/2014 |

OTHER PUBLICATIONS

Danish Search Report for PA 2014 70724, dated Jun. 17, 2015.
International Search Report for PCT/DK2015/050353, dated Feb. 18, 2016.

* cited by examiner

METHOD FOR ESTIMATING A WIND SPEED AT A WIND TURBINE

FIELD OF THE INVENTION

The present invention relates to a method for estimating a wind speed at a position of a wind turbine. According to the method of the invention, the wind speed can be estimated fast and in a stable and reliable manner.

BACKGROUND OF THE INVENTION

When operating a wind turbine it is sometimes desirable to be able to estimate the wind speed prevailing at the wind turbine, more particularly the wind speed experienced by the wind turbine blades of the wind turbine. When the wind speed is measured, this is often done at a point behind the rotor of the wind turbine. Thereby the measured wind speed is affected by the impact on the wind by the rotor, and therefore it does not reflect the wind speed at a position in front of the rotor. Furthermore, since the wind speed is typically measured in a single point, it will not reflect variations in the wind speed across an area defined by the rotor. Accordingly, controlling the wind turbine on the basis of such a measured wind speed may lead to inaccurate control of the wind turbine.

Therefore, various attempts have previously been made in order to provide an estimate for the wind speed at a wind turbine.

U.S. Pat. No. 5,155,375 discloses a controller and a method for operating a variable speed wind turbine to better track wind speed fluctuations for greater efficiency in conversion of wind energy to electrical energy. The rotor speed is controlled with a wind speed supplied by a wind observer which predicts the average wind speed at a subsequent point in time over the cross section presented to the wind by the wind turbine. The wind speed is predicted as a function of the present (previously predicted) wind speed and correction terms including net torque and the difference between the predicted and actual rotor speed.

DESCRIPTION OF THE INVENTION

It is an object of the invention to provide a method for estimating a wind speed at a wind turbine that can be performed in a fast and reliable manner.

The method provides a method for estimating a wind speed at a wind turbine, the wind turbine comprising a rotor carrying a set of wind turbine blades, each wind turbine blade having a variable pitch angle, the method comprising the steps of:
  obtaining a rotational speed, $\omega$, of the rotor,
  obtaining a pitch angle, $\theta$, of the wind turbine blades,
  deriving a minimum tip speed ratio, $\lambda_{min}$, based on the obtained pitch angle, $\theta$, the minimum tip speed ratio, $\lambda_{min}$, defining a limit between a stable and a potentially unstable control region,
  selecting an initial tip speed ratio, $\lambda_{init}$, where $\lambda_{init} > \lambda_{min}$,
  deriving an initial estimated wind speed, $v_{init}$, based on the selected initial tip speed ratio, $\lambda_{init}$, and the obtained rotational speed, $\omega$, and
  iteratively deriving an estimated wind speed, $v_{est}$, based on the obtained rotational speed, $\omega$, and the obtained pitch angle, $\theta$, and using the derived initial estimated wind speed, $v_{init}$, as a starting point.

The invention provides a method for estimating a wind speed at a wind turbine, the wind turbine comprising a rotor carrying a set of wind turbine blades. The wind turbine blades catch the wind, thereby causing the rotor to rotate, i.e. the energy of the wind is transformed into mechanical energy. The rotor is connected to a generator, e.g. via a drive train. Thereby the mechanical energy, in the form of rotational movements of the rotor, is transformed into electrical energy, which may be supplied to a power grid.

The estimated wind speed may advantageously be a wind speed prevailing in front of the rotor of the wind turbine, i.e. the wind speed which is experienced by the wind turbine blades carried by the rotor.

Each of the wind turbine blades has a variable pitch angle. Thus, each of the wind turbine blades can be rotated about a longitudinal axis, in order to adjust an angle of attack between the wind and the wind turbine blade. Accordingly, the wind turbine is of a pitch controlled type.

According to the method of the invention, a rotational speed, $\omega$, of the rotor and a pitch angle, $\theta$, of the wind turbine blades are obtained. This may include measuring the rotational speed and/or the pitch angle. As an alternative, the rotational speed and/or the pitch angle may be obtained from a control unit controlling the wind turbine, the rotor and/or a pitch system of the wind turbine.

Next, a minimum tip speed ratio, $\lambda_{min}$, is derived, based on the obtained pitch angle, $\theta$. The minimum tip speed ratio, $\lambda_{min}$, is selected in such a manner that it defines a limit between a stable and a potentially unstable control region. In the present context the term 'stable control region' should be interpreted to mean a control region in which the wind speed is estimated in a stable manner. For instance, the stable control region could be a region where the wind speed estimation converges. Similarly, in the present context the term 'potentially unstable control region' should be interpreted to mean a control region in which the estimation of the wind speed may become unstable. For instance, an unstable control region could be a control region in which the wind speed estimation does not converge. Accordingly, the minimum tip speed ratio, $\lambda_{min}$, defines a limit or a boundary in the sense that when the wind turbine is operated at tip speed ratios below the minimum tip speed ratio, $\lambda_{min}$, the estimation of the wind speed is unstable, and when the wind turbine is operated at tip speed ratios above the minimum tip speed ratio, $\lambda_{min}$, the estimation of the wind speed is stable.

Next, an initial tip speed ratio, $\lambda_{init}$, is selected in such a manner that $\lambda_{init} > \lambda_{min}$. Thus, the initial tip speed ratio, $\lambda_{init}$, is within the stable region, i.e. if the wind turbine is operated at the initial tip speed ratio, $\lambda_{init}$, the estimation of the wind speed is stable.

Then an initial estimated wind speed, $v_{init}$, is derived, based on the selected initial tip speed ratio, $\lambda_{init}$, and the obtained rotational speed. The tip speed ratio is defined as:

$$\lambda = \frac{\omega R}{v},$$

where $\omega$ is the rotational speed of the rotor, R is the radius of the rotor, and v is the wind speed. Accordingly, the initial estimated wind speed, $v_{init}$, can be derived as:

$$v_{init} = \frac{\omega R}{\lambda_{init}}.$$

Finally, an estimated wind speed, $v_{est}$, is iteratively estimated, based on the obtained rotational speed, ω, and the obtained pitch angle, θ, and using the derived initial estimated wind speed, $v_{init}$, as a starting point. Thus, the initial estimated wind speed, $v_{init}$, is used as a starting point for an iterative process for estimating the wind speed at the wind turbine. Since the initial estimated wind speed, $v_{init}$, corresponds to a tip speed ratio, $\lambda_{init}$, which is within the stable control region, it provides a good starting point for the iterative process, which ensures that the iterative process converges fast and reliably. Thus, it is ensured that the wind speed is estimated in a stable manner, such as in a converging manner. This is even true if the actual tip speed ratio is not within the stable control region, e.g. in a stall situation, in case of icing on the wind turbine blades or in case of yaw error, because the initial tip speed ratio, $\lambda_{init}$, is still selected in the stable control region in this case.

Thus, the invention provides an iterative method for estimating a wind speed, and it is ensured that an accurate estimate for the wind speed is reached in a fast and reliable manner.

The method may further comprise the step of controlling the wind turbine in accordance with the estimated wind speed, $v_{est}$. According to this embodiment, the invention further provides a method for controlling a wind turbine.

The step of controlling the wind turbine may, e.g., include controlling the pitch angle of the wind turbine blades, the rotational speed of the rotor, a power output of the wind turbine, etc.

Alternatively or additionally, the estimated wind speed, $v_{est}$, may be used for other purposes, such as fault detection in the wind turbine.

The step of deriving a minimum tip speed ratio, $\lambda_{min}$, may comprise using a minimum tip speed ratio look-up table comprising interrelated values of pitch angle, θ, and minimum tip speed ratio, $\lambda_{min}$. According to this embodiment, the minimum tip speed ratio look-up table is provided before operation of the wind turbine is initiated, and during operation the previously tip speed ratio look-up table is consulted whenever this is required in order to derive a minimum tip speed ratio. Using a look-up table is a simple approach, which limits the required processing power for performing the method.

The minimum tip speed ratio look-up table may provide discrete interrelated values of pitch angle, θ, and minimum tip speed ratio, $\lambda_{min}$. In this case an interpolation between two discrete values may be performed when the minimum tip speed ratio, $\lambda_{min}$, is derived, based on the pitch angle, θ.

The selected initial tip speed ratio, $\lambda_{init}$, may exceed the minimum tip speed ratio, $\lambda_{min}$, at least by a predefined amount. According to this embodiment, the selected initial tip speed ratio, $\lambda_{init}$, is well within the stable control region, thereby representing a very good starting point for the iterative process, ensuring that the wind speed is estimated in a fast and reliable manner.

The method may further comprise the steps of:
setting a flag, indicating that the estimated wind speed, $v_{est}$, is unreliable, in the case that the estimated wind speed, $v_{est}$, results in an estimated tip speed ratio, $\lambda_{est}$, which is lower than the minimum tip speed ratio, $\lambda_{min}$, and
controlling the wind turbine in accordance with an estimated wind speed corresponding to $\lambda_{min}$, and in accordance with the flag.

According to this embodiment, an estimated tip speed ratio, $\lambda_{est}$, corresponding to the estimated wind speed, $v_{est}$, is calculated and compared to the minimum tip speed ratio, $\lambda_{min}$. The estimated tip speed ratio, $\lambda_{est}$, is calculated as:

$$\lambda_{est} = \frac{\omega R}{v_{est}}.$$

When the estimated tip speed ratio, $\lambda_{est}$, decreases below the minimum tip speed ratio, $\lambda_{min}$, this is an indication that an unstable control region is entered, and that the estimated wind speed, $v_{est}$, provided by the method may no longer be reliable. Therefore a flag is set, indicating this to the system and/or to an operator. As a consequence, the wind turbine is no longer controlled in accordance with the estimated wind speed. Instead, the wind turbine is controlled in accordance with an estimated wind speed, which corresponds to the minimum tip speed ratio, $\lambda_{min}$, and in accordance with the flag, i.e. bearing in mind that the estimated wind speed, $v_{est}$, is unreliable.

The method may further comprise the steps of:
estimating a tip speed ratio, $\lambda_{est}$, based on the obtained rotational speed, ω, and the estimated wind speed, $v_{est}$, and
removing the flag and controlling the wind turbine in accordance with the estimated wind speed, $v_{est}$, in the case that the estimated tip speed ratio, $\lambda_{est}$, increases above the minimum tip speed ratio, $\lambda_{min}$.

According to this embodiment, once the flag, indicating that the estimated wind speed, $v_{est}$, is unreliable, has been set, the estimated tip speed ratio, $\lambda_{est}$, is continuously calculated, in the manner described above, and compared to the minimum tip speed ratio, $\lambda_{min}$. When the estimated tip speed ratio, $\lambda_{est}$, increases above the minimum tip speed ratio, this is an indication that a stable control region is once again entered. Accordingly, the estimated wind speed, $v_{est}$, is once again considered reliable.

As a consequence, the flag is removed, and the wind turbine is once again controlled in accordance with the estimated wind speed, $v_{est}$.

According to one embodiment, the flag may remain set until the estimated tip speed ratio, $\lambda_{est}$, has increased above the minimum tip speed ratio, by a predefined amount and/or for a predefined period of time. Thereby it is avoided that the flag is continuously set and removed in the case that the estimated tip speed ratio, $\lambda_{est}$, is close to the minimum tip speed ratio, $\lambda_{min}$.

The step of iteratively deriving an estimated wind speed, $v_{est}$, may comprise using a $c_P$ look-up table comprising interrelated values of rotational speed, ω, wind speed, v, pitch angle, θ, and power coefficient, $c_P$.

According to this embodiment, a power coefficient, $c_P$, is obtained as an intermediate step when estimating the wind speed, $v_{est}$, by means of the $c_P$ look-up table. The power coefficient, $c_P$, derived as an intermediate step in this manner may be used for other purposes than estimating the wind speed and/or controlling the wind turbine. For instance, the power coefficient, $c_P$, may be used for monitoring purposes.

The step of iteratively deriving an estimated wind speed, $v_{est}$, may comprise estimating a power output, $P_{est}$, of the wind turbine, and comparing the estimated power output, $P_{est}$, to a measured power output, $P_{meas}$, of the wind turbine. If the estimated power output, $P_{est}$, differs from the measured power output, $P_{meas}$, then the estimated wind speed, $v_{est}$, probably also differs from the actual wind speed. Therefore, the estimated wind speed, $v_{est}$, is adjusted for the next iteration, if it is determined that the estimated power output, $P_{est}$, differs from the measured power output, $P_{meas}$.

There is also provided a wind turbine and a computer program product configured to implement one or more of the features of the method described hereinabove.

All embodiments and features of the invention described herein may be combined in any combination.

BRIEF DESCRIPTION OF THE DRAWINGS

The invention will now be described in further detail with reference to the accompanying drawings in which.

DETAILED DESCRIPTION OF THE DRAWINGS

Figure 1:
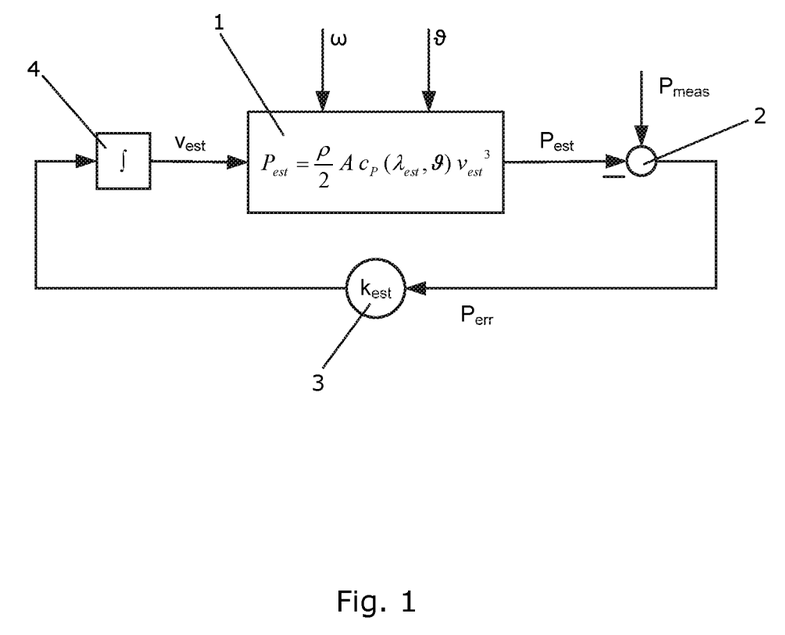
FIG. 1 is a block diagram illustrating a method according to an embodiment of the invention.

FIG. 1 is a block diagram illustrating a method according to an embodiment of the invention, in the form of a closed loop approximation process. A rotational speed, $\omega$, of the rotor of a wind turbine, and a pitch angle, $\theta$, of the wind turbine blades of the wind turbine are measured and supplied to an estimating block 1. Furthermore, a previously estimated wind speed, $v_{est}$, is also supplied to the estimating block 1.

In the estimating block 1, an estimated power output, $P_{est}$, is calculated, based on the supplied parameters, $\omega$, $\theta$ and $v_{est}$. This includes deriving a power coefficient, $c_P$, e.g. by means of a $c_P$ look-up table, based on an estimated tip speed ratio, $\lambda_{est}$, and the pitch angle, $\theta$.

The estimated power output, $P_{est}$, is compared to a measured power output, $P_{meas}$, at a comparator 2. This results in an error signal, $P_{err}$. If the error signal, $P_{err}$, is zero, then $P_{est}=P_{meas}$, indicating that the estimated wind speed, $v_{est}$, supplied to the estimator block 1 is equal to or close to the actual wind speed prevailing at the wind turbine.

If the error signal, $P_{err}$, is positive, then the measured power output, $P_{meas}$, is larger than the estimated power output, $P_{est}$, indicating that the expected power output at the estimated wind speed, $v_{est}$, is lower than the actual power output. This indicates that the estimated wind speed, $v_{est}$, is lower than the actual wind speed prevailing at the wind turbine, and the estimated wind speed, $v_{est}$, should therefore be increased.

Similarly, if the error signal, $P_{err}$, is negative, then the measured power output, $P_{meas}$, is smaller than the estimated power output, $P_{est}$, indicating that the expected power output at the estimated wind speed, $v_{est}$, is higher than the actual power output. This indicates that the estimated wind speed, $v_{est}$, is higher than the actual wind speed prevailing at the wind turbine, and the estimated wind speed, $v_{est}$, should therefore be decreased.

The adjustments to the estimated wind speed, $v_{est}$, described above, are performed in the following manner. The error signal, $P_{err}$, is multiplied by a gain factor, $k_{est}$, at multiplier 3, and the resulting signal is supplied to an integrator 4. At the integrator 4 the signal received from the multiplier 3 is integrated, resulting in a new estimated wind speed, $v_{est}$, which is supplied to the estimating block 1 for the next iteration.

Thus, the estimation process described above is an iterative process. In order to start the iterative process, an initial wind speed, $v_{init}$, is supplied to the estimating block 1. The initial wind speed, $v_{init}$, is derived in the following manner.

A minimum tip speed ratio, $\lambda_{min}$, is derived, based on the measured pitch angle, $\theta$. The minimum tip speed ratio, $\lambda_{min}$, defines a limit between a stable and an unstable control region, at the measured pitch angle, $\theta$. Thus, at tip speed ratios above the minimum tip speed ratio, $\lambda_{min}$, the wind speed is estimated in a stable manner, and at tip speed ratios below the minimum tip speed ratio, $\lambda_{min}$, the wind speed is potentially estimated in an unstable manner.

An initial tip speed ratio, $\lambda_{init}$, is selected, in such a manner that $\lambda_{init} > \lambda_{min}$. Accordingly, the selected initial tip speed ratio, $\lambda_{init}$, is well within the stable control region. The initial estimated wind speed, $v_{init}$, is then derived, based on the measured rotational speed, $\omega$, of the rotor and the selected initial tip speed ratio, $\lambda_{init}$. Thus, the initial wind speed, $v_{init}$, which is used as a starting point for the iterative process described above, corresponds to the initial tip speed ratio, $\lambda_{init}$, and is therefore also well within the stable control region at the measured pitch angle, $\theta$. This ensures that the iterative process converges in a fast and reliable manner, i.e. a reliable estimate for the wind speed is reached fast.

Figure 2:
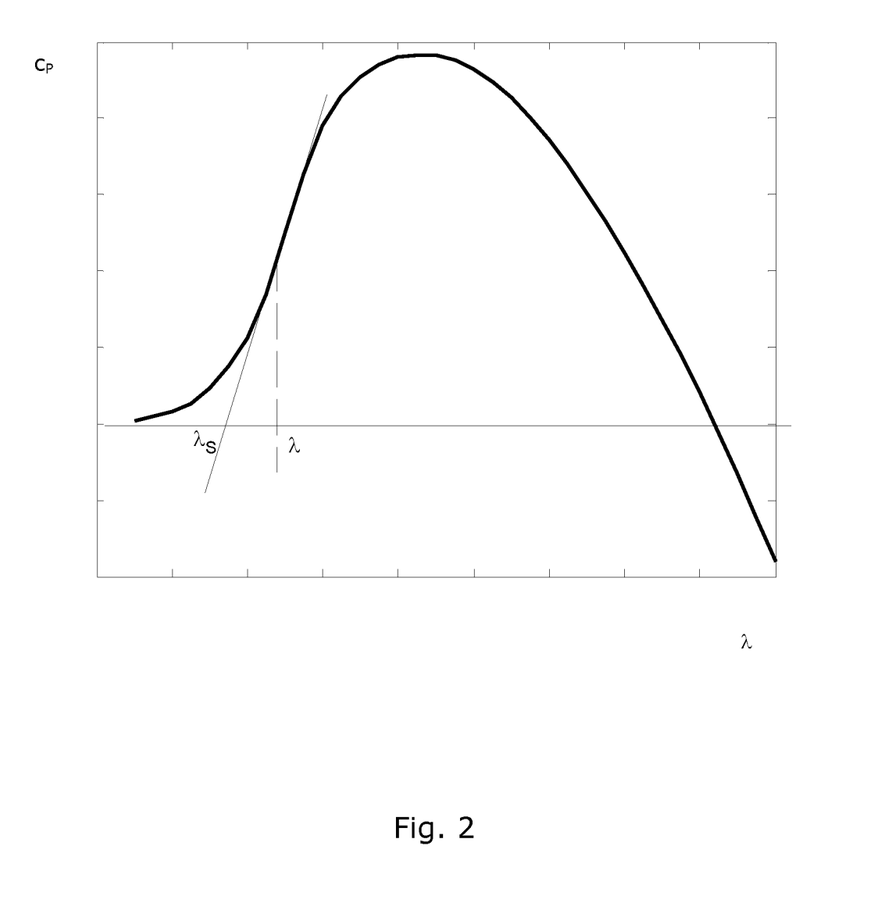
FIG. 2 is a graph illustrating power coefficient, $c_P$, as a function of tip speed ratio, $\lambda$, for a fixed pitch angle.

FIG. 2 is a graph illustrating power coefficient, $c_P$, as a function of tip speed ratio, $\lambda$, for a fixed pitch angle. The graph of FIG. 2 illustrates how a minimum tip speed ratio, $\lambda_{min}$, can be determined.

The power output, P, of the wind turbine is given as:

$$P = \frac{\rho}{2} A c_P(\lambda, \theta) v^3,$$

where P is the power output, $\rho$ is the air density, A is an area swept by the rotor, $c_P(\lambda,\theta)$ is the power coefficient, depending on the tip speed ratio, $\lambda$, and the pitch angle, $\theta$, and v is the wind speed.

It can be assumed that the wind turbine is operated within a stable control region as long as the partial derivative of the power output with respect to the wind speed is positive. The partial derivative of the power output with respect to wind speed is given as:

$$\frac{\partial P}{\partial v} = \frac{\rho}{2} A \left(3v^2 c_P + v^3 \frac{\partial c_P}{\partial v}\right).$$

The partial derivative of the rotor power coefficient is given as:

$$\frac{\partial c_p}{\partial v} = \frac{\partial c_P}{\partial \lambda} \frac{\partial \lambda}{\partial v},$$

where $$\lambda = \frac{R\omega}{v} \Rightarrow \frac{\partial \lambda}{\partial v} = -\frac{R\omega}{v^2}.$$

Inserting this in the equation above regarding the partial derivative of the power output results in:

$$\frac{\partial P}{\partial v} = \frac{\rho}{2} A \left(3v^2 c_P - R\omega v \frac{\partial c_P}{\partial \lambda}\right) = \frac{\rho}{2} A v^2 \left(3c_P - \lambda \frac{\partial c_P}{\partial \lambda}\right).$$

Hence, the wind turbine is operated within a stable control region if:

$$\frac{\partial c_P}{\partial \lambda} < \frac{3c_P}{\lambda}.$$

This sets a restriction on the gradient of the power coefficient, $c_P$, versus the tip speed ratio, $\lambda$. This is illustrated in the graph of FIG. 2, where a tangent of the curve is shown in a point corresponding to a specific tip speed ratio, $\lambda$. If the tangent intersects the ordinate axis at a point, $\lambda_s > \frac{2}{3}\lambda$, then the equation above will be violated, and the wind turbine will be operated in an unstable control region. Based on this, a minimum tip speed ratio, $\lambda_{min}$, can be derived, which defines a limit between a stable and an unstable control region. Minimum tip speed ratios, $\lambda_{min}$, for various pitch angles, $\theta$, can be derived in this manner, and inserted into a look-up table, which can be consulted during operation of the wind turbine.

Figure 3:
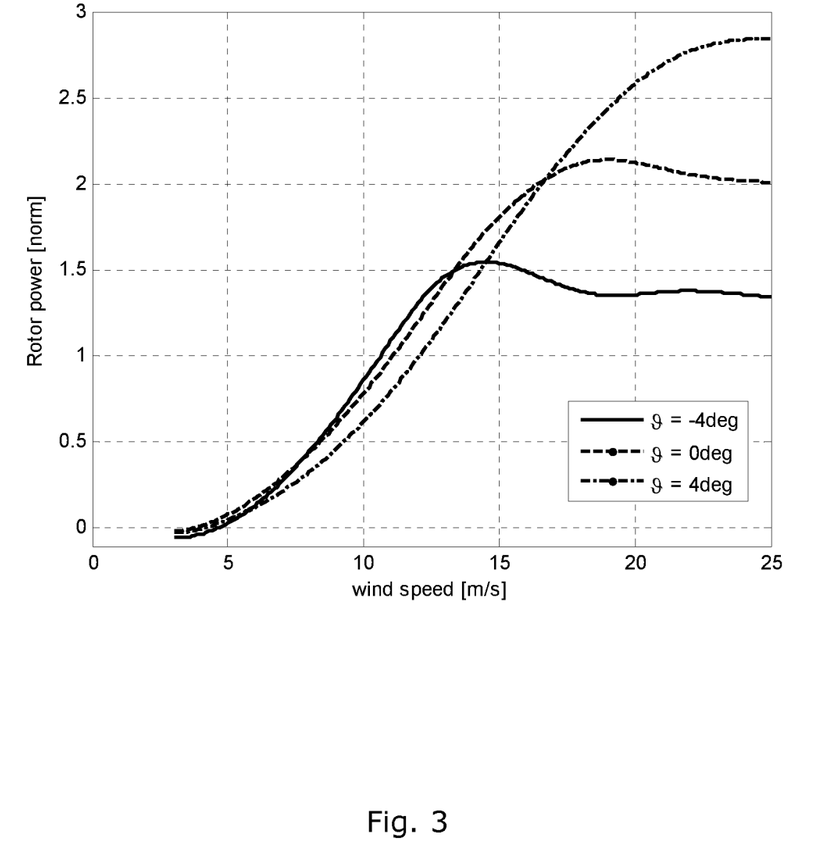
FIG. 3 is graph illustrating power output as a function of wind speed for three different pitch angles.

FIG. 3 is graph illustrating power output as a function of wind speed for three different pitch angles, $\theta=-4°$, $\theta=0°$, and $\theta=4°$. All three curves represent that the wind turbine is operated at nominal rotational speed, $\omega$. It can be seen that some of the curves have portions with a negative gradient, $$\frac{\partial P}{\partial v},$$

i.e. portions where the wind speed estimation would not converge. These portions are all in a region where the power output is above the rated power output. However, for other pitch angles and/or for other rotors, such regions may occur below rated power, in which case it is necessary to establish the minimum tip speed ratio, in the manner described above, in order to ensure stable wind speed estimation.

Figure 4:
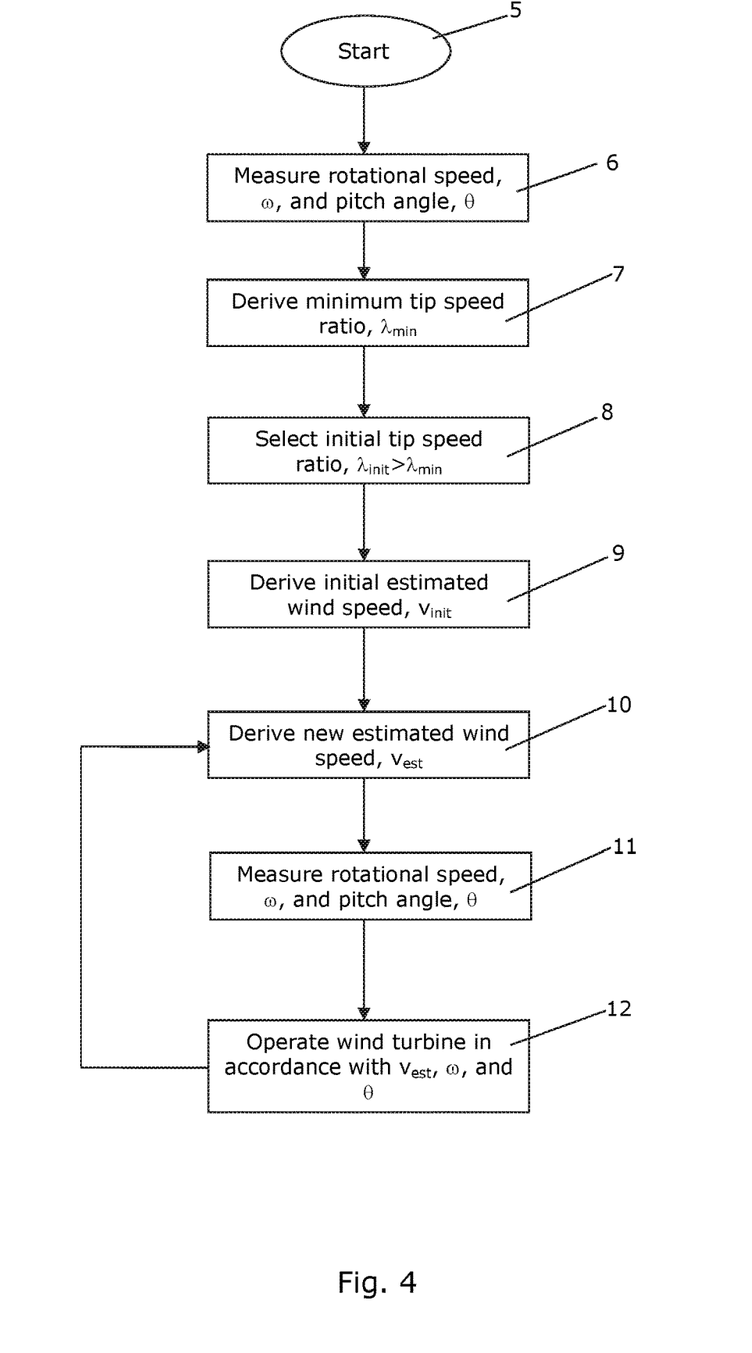
FIG. 4 is a flow chart illustrating a method according to an embodiment of the invention.

FIG. 4 is a flow chart illustrating a method according to an embodiment of the invention. The process is started at step 5. At step 6 the rotational speed, $\omega$, of the rotor of the wind turbine and the pitch angle, $\theta$, of the wind turbine blades of the wind turbine are measured, or obtained in another suitable manner.

At step 7 a minimum tip speed ratio, $\lambda_{min}$, is derived, based on the measured pitch angle, $\theta$. The minimum tip speed ratio, $\lambda_{min}$, defines a limit between a stable and an unstable control region for the wind speed estimation. The minimum tip speed ratio, $\lambda_{min}$, may, e.g., be derived in the manner described above with reference to FIG. 2.

Thus, when the wind turbine is operated at tip speed ratios which are above the minimum tip speed ratio, $\lambda_{min}$, the wind speed estimation is within a stable control region. When the wind turbine is operated at tip speed ratios which are below the minimum tip speed ratio, $\lambda_{min}$, the wind speed estimation is within an unstable control region.

At step 8 an initial tip speed ratio, $\lambda_{init}$, is selected in such a manner that $\lambda_{init} > \lambda_{min}$. Thus, the initial tip speed ratio, $\lambda_{init}$, is selected in such a manner that it is well within the stable control region.

At step 9 an initial estimated wind speed, $v_{init}$, is derived, based on the selected initial tip speed ratio, $\lambda_{init}$. Thus, the derived initial estimated wind speed, $v_{init}$, corresponds to the initial tip speed ratio, $\lambda_{init}$, and therefore the initial estimated wind speed, $v_{init}$, is also well within the stable control region. Therefore the initial estimated wind speed, $v_{init}$, is a good starting point for an iterative process for estimating the wind speed prevailing at the wind turbine.

Accordingly, at step 10, an iterative process is started, in which a new estimated wind speed, $v_{est}$, is derived, based on the initial estimated wind speed, $v_{init}$, the measured rotational speed, $\omega$, and the measured pitch angle, $\theta$.

At step 11 the rotational speed, $\omega$, and the pitch angle, $\theta$, are measured, and at step 12 the wind turbine is operated in accordance with the estimated wind speed, $v_{est}$, the measured rotational speed, $\omega$, and the measured pitch angle, $\theta$. Then the process is returned to step 10, where a new estimated wind speed, $v_{est}$, is derived, based on the previous estimated wind speed, $v_{est}$, the measured rotational speed, $\omega$, and the measured pitch angle, $\theta$. Accordingly, an iterative process is performed in order to obtain an estimated wind speed, $v_{est}$, which is close to the actual wind speed prevailing at the wind turbine.

Since the initial estimated wind speed, $v_{init}$, which is used as a starting point for the iterative process, is selected in such a manner that it is well within the stable control region, it is ensured that the iterative process converges fast and reliably. Thus, a reliable estimate for the wind speed is reached fast.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for estimating a wind speed at a wind turbine, the wind turbine comprising a rotor carrying a set of wind turbine blades, each wind turbine blade having a variable pitch angle, the method comprising:
   obtaining a rotational speed of the rotor;
   obtaining a pitch angle of the wind turbine blades;
   deriving a minimum tip speed ratio based on the obtained pitch angle, the minimum tip speed ratio defining an upper limit of a stable control region;
   selecting an initial tip speed ratio that is greater than the minimum tip speed ratio;
   deriving an initial estimated wind speed based on the initial tip speed ratio and the obtained rotational speed;
   iteratively deriving an estimated wind speed based on the obtained rotational speed and the obtained pitch angle, and using the derived initial estimated wind speed as a starting point; and
   using the estimated wind speed to control the wind turbine, wherein stability of the control region is based on a stability of the estimated wind speed.

2. The method according to claim 1, further comprising controlling the wind turbine in accordance with the estimated wind speed.

3. The method according to claim 1, wherein deriving a minimum tip speed ratio further comprises using a minimum tip speed ratio look-up table comprising interrelated values of pitch angle and minimum tip speed ratio.

4. The method according to claim 1, wherein the selected initial tip speed ratio exceeds the minimum tip speed ratio at least by a predefined amount.

5. The method according to claim 1, further comprising:
   calculating an estimated tip speed ratio based on the obtained rotational speed and the estimated wind speed;

setting a flag, indicating that the estimated wind speed is unreliable, when the estimated wind speed results in the estimated tip speed ratio being lower than the minimum tip speed ratio; and controlling the wind turbine in accordance with an alternate estimated wind speed, the alternate estimated wind speed corresponding to the minimum tip speed ratio and in accordance with the flag.

6. The method according to claim 5, further comprising:
removing the flag and controlling the wind turbine in accordance with the estimated wind speed when the estimated tip speed ratio increases above the minimum tip speed ratio.

7. The method according to claim 1, wherein iteratively deriving an estimated wind speed further comprises using a look-up table comprising interrelated values of rotational speed, wind speed, pitch angle, and power coefficient.

8. The method according to claim 1, wherein iteratively deriving an estimated wind speed further comprises:
estimating a power output of the wind turbine and forming a power error signal by comparing the estimated power output to a measured power output of the wind turbine.

9. The method according to claim 8, further comprising adjusting the power error signal by applying a gain factor and integrating the adjusted power error signal to form a new estimated wind speed feedback.

10. The method according to claim 1, wherein the defined limit is such that when the wind turbine is operated at tip speed ratios below the minimum tip speed ratio, the estimated wind speed is unstable, and when the wind turbine is operated at tip speed ratios above the minimum tip speed ratio the estimated wind speed is stable.

11. The method according to claim 1, wherein the upper limit of the stable control region is determined in part by where, for a given pitch angle, a partial derivative of a power output with respect to the wind speed is positive.

12. A wind turbine comprising: a rotor carrying a set of wind turbine blades, each wind turbine blade having a variable pitch angle; and a controller configured to implement an operation for estimating a wind speed at a wind turbine, the operation comprising:

obtaining a rotational speed of the rotor;
obtaining a pitch angle of the wind turbine blades;
deriving a minimum tip speed ratio based on the obtained pitch angle, the minimum tip speed ratio defining a boundary between a stable control region and an unstable control region;
selecting an initial tip speed ratio that is greater than the minimum tip speed ratio;
deriving an initial estimated wind speed based on the selected initial tip speed ratio and the obtained rotational speed; and
iteratively deriving an estimated wind speed based on the obtained rotational speed and the obtained pitch angle and using the derived initial estimated wind speed as a starting point;
wherein stability of the control region is based on a stability of the estimated wind speed.

13. A computer program product comprising computer executable code on a non-transitory computer readable storage medium which, when executed by one or more processors, implements an operation for estimating a wind speed at a wind turbine, the wind turbine comprising a rotor carrying a set of wind turbine blades, each wind turbine blade having a variable pitch angle, the operation comprising:

obtaining a rotational speed of the rotor;
obtaining a pitch angle of the wind turbine blades;
deriving a minimum tip speed ratio based on the obtained pitch angle, the minimum tip speed ratio defining an upper limit of a stable control region;
selecting an initial tip speed ratio that is greater than the minimum tip speed ratio;
deriving an initial estimated wind speed based on the initial tip speed ratio and the obtained rotational speed;
iteratively deriving an estimated wind speed based on the obtained rotational speed and the obtained pitch angle, and using the derived initial estimated wind speed as a starting point; and
using the estimated wind speed to control the wind turbine, wherein stability of the control region is based on a stability of the estimated wind speed.

* * * * *